Oct. 24, 1967     M. L. J. JEZO     3,349,392
REPETITIVE PULSE DETECTOR
Filed May 17, 1966
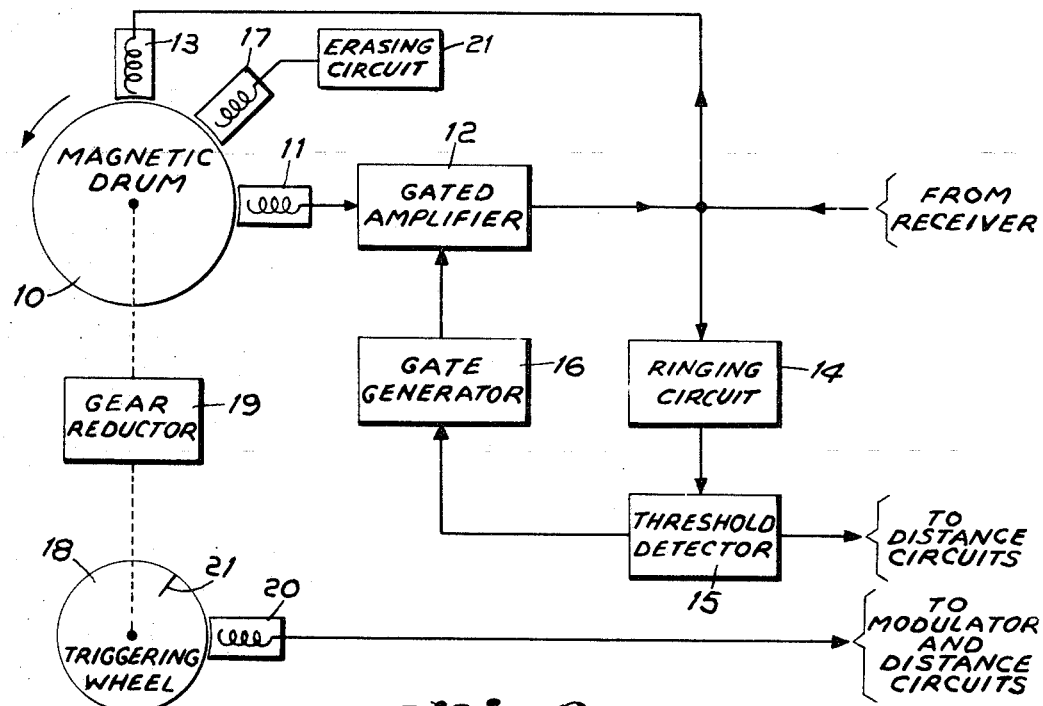
*Fig. 1*
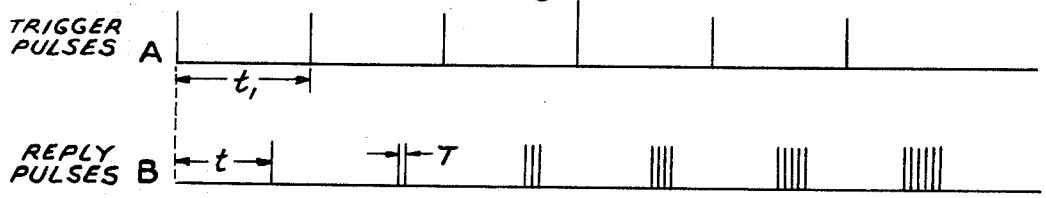
*Fig. 2*
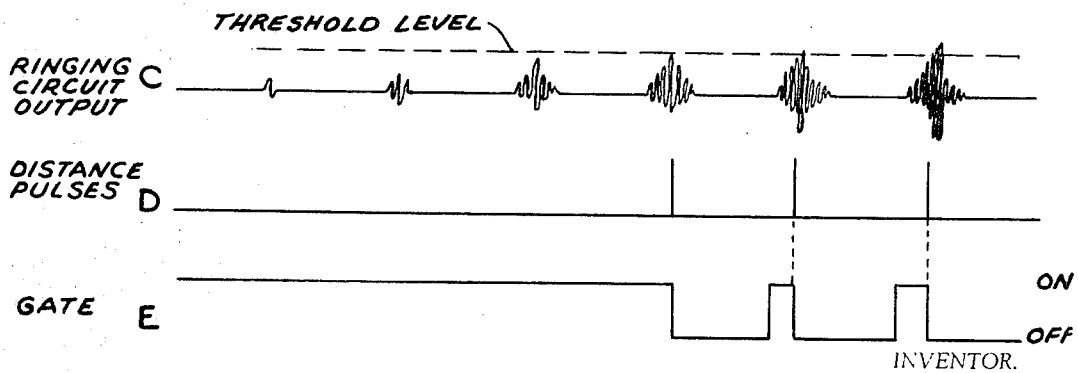
INVENTOR.
MAURICE L. J. JEZO
BY Richard J. Seligman
ATTORNEY

United States Patent Office 3,349,392
Patented Oct. 24, 1967

3,349,392
REPETITIVE PULSE DETECTOR
Maurice L. J. Jezo, Cedar Grove, N.J., assignor to International Telephone and Telegraph Corporation, Nutley, N.J., a corporation of Maryland
Filed May 17, 1966, Ser. No. 550,854
12 Claims. (Cl. 343—6.8)

This invention relates to apparatus for detecting signals consisting of pulses having a predetermined repetition rate, which pulses are interleaved in a random pulse train, and more particularly to radio navigation distance measuring equipment (DME) for detecting replies to interrogating signals.

In many systems it is necessary to detect signals consisting of pulses having a predetermined repetition rate, in the presence of other pulses and noise. For example, in certain aerial navigation systems such as TACAN, described in volume 33, March 1956, of "Electrical Communication," the technical journal of the International Telephone and Telegraph Corporation and associated companies, distance information is obtained on airborne equipment by transmitting interrogating signals to a transponder beacon, receiving the replies thereto, and measuring the time lapse betwen the interrogation and the reply which is proportional to distance. In TACAN approximately 7200 pulses per second are generated by the beacon and for distance measuring purposes it is necessary that the airborne equipment pick out from this multitude of pulses only the replies to its interrogations. Discrimination between replies and the other pulses which are random in nature is difficult, often requiring very long search times.

Accordingly, it is an object of this invention to provide apparatus for detecting signals consisting of pulses having a predetermined repetition rate.

Another object of this invention is to provide apparatus for distance measuring equipment in which there is provided fast recognition of reply pulses transmitted by a beacon in response to interrogations from airborne equipment.

The above-mentioned and other features and objects of this invention will become more apparent by reference to the following description taken in conjunction with the accompanying drawings, in which:

FIGURE 1 is a block diagram of a distance measuring scheme according to the invention; and FIGURE 2 is a series of waveforms illustrating the operation of the circuit of FIGURE 1.

Briefly, the herein disclosed embodiment of my invention provides apparatus for rapidly deriving the DME reply pulses generated by a beacon in response to airborne interrogations from the large plurality of pulses received by the airborne receiver. The apparatus includes a magnetic drum rotating at a first speed upon which the decoded pulses from the receiver are recorded, and a second drum rotating at a speed different from that of the first drum for supplying a trigger for the DME interrogator. The reply pulses from the beacon are recorded on the first magnetic drum so as to be spaced by predetermined intervals, read by a magnetic head and applied to a ringing circuit with an output indicated when a threshold level is exceeded. The apparatus further comprises means for rewriting a portion of the read pulses back onto the magnetic drum, so that a buildup of successive reply pulses will occur with each pulse separated from the next by a fixed amount and yet preclude saturation of the drum.

FIGURE 1 illustrates an embodiment in accordance with the invention, comprising a magnetic drum 10 upon which decoded pulses received by an airborne receiver are recorded. In this embodiment magnetic drum 10 is illustrated as rotating in a counter clockwise direction. The pulses from the receiver are impressed on magnetic drum 10 by a magnetic head 13. They are also applied to a ringing circuit 14. A second magnetic head 11 reads the information stored on magnetic drum 10 during the on-time of a gated amplifier 12 and applies some to ringing circuit 14. Simultaneously the pulse read off of drum 10 are fed to record head 13 by way of gated amplifier 12 to be recorded back onto magnetic drum 10. The output of ringing circuit 14 is coupled to a threshold detector 15 (the threshold level of which is shown in FIGURE 2C) with the output therefrom applied as an input to distance circuits (not shown) where the actual quantitative distance measurement is made. The output from threshold detector 15 is also fed to a gate generator 16 whose output is applied as one input to gated amplifier 12. A third magnetic head 17 and erasing circuitry 21 is employed to continually erase the drum 10.

A second drum 18 is coupled to drum 10 via a gear reductor 19 such that drums 10 and 18 rotate together but at different speeds. Drum 18 (also referred to as a triggering wheel) initiates the interrogation of the beacon by supplying a trigger to the modulator of the airborne transmitter (not shown) and furnishes an input to the distance circuits. In this exemplary embodiment drum 18 is a magnetic drum with the trigger pulse obtained by reading a mark on the drum with a magnetic head 20. It would be obvious to those skilled in the art that many other variations could be employed to trigger the airborne transmitter for sending the interrogation pulses and for supplying a reference pulse to the distance circuits from which to measure distance.

Operation of the embodiment of FIGURE 1 is here described with reference to the waveforms of FIGURE 2. Trigger pulses for causing the airborne transmitter to initiate interrogation of a beacon are derived from drum 18 when a particular portion of the drum is in alignment with magnetic head 20 so as to be read thereby. One trigger pulse occurs for each revolution of drum 18. These pulses are illustrated in FIG. 2A and are spaced by the time period $t_1$.

A beacon receiving an interrogation transmits in response thereto a reply consisting of a pulse pair among its random pulse transmissions. The pulse pair is received by the airborne receiver and decoded as a single pulse. The pulses from the receiver after decoding which have a spacing $t_1$ and which include the interrogation reply interleaved among the random pulses, are written onto the magnetic drum 10 by recording head 13 and applied to ringing circuit 14. The reply pulses written onto drum 10 are illustrated in FIGURE 2B. It should be noted at this time that all pulses received by the receiver are written onto the drum but only the interrogation reply pulses are illustrated for explanation purposes. The pulses from the receiver are applied to ringing circuit 14 directly in order that the reply pulse be fed with the pulses read from drum 10 since it may be the pulse which will trigger the threshold circuit.

The information written upon drum 10 is read by magnetic head 11 and applied via gated amplifier 12 to a ringing circuit 14, the output thereof being shown in FIGURE 2C. This information, that read by magnetic head 11, is also rewritten onto drum 10 while gated amplifier 12 is on. The output from ringing circuit 14 is applied to threshold detector 15 so that when the ringing is such that it exceeds the level of the threshold detector gate generator 16 is turned off and distance pulses will be positively indicated as shown in FIGURE 2D. It is pointed out that the speed of the drums 10 and 18 are such that the spacing T between the reply pulses is equal to the period of ringing circuit 14. Also, it is pointed out that detector 15 has built in delay circuit such that a distance pulse will only be generated on the first closely spaced output pulse from ringing circuit 14 exceeding the threshold value. After the distance pulse is generated, a predetermined delay period, longer than approximately 7T (in this particular embodiment) and less than $t$, must elapse before the detector 15 is rendered capable of generating another distance pulse. The spacing T between the reply pulses recorded on drum 10 and the newly received reply pulses is equal to the period of the ringing circuit 14 in order to provide the system with noise immunity. It is foreseeable that a noise pulse may appear in the system at a time T before or after a reply pulse and cause a false distance pulse to be generated, but it is highly improbable that such random noise pulses will appear periodically in exactly the proper positions with respect to the reply pulses to cause a periodic erroneous generation of distance pulses. Therefore, over long periods of time one could realistically expect only a very few random erroneous distance pulses due to random noise in the system.

It is these pulses which are applied to the distance circuits for quantitative distance measuring.

The output from threshold detector 15 is applied as an input to gate generator 16 for generating a gate of predetermined duration less than $t_1$ which determines the length of time when gated amplifier 12 will be on. This is the period when pulses are read from the surface of magnetic drum 10 and fed to record head 13 and to ringing circuit 14. During the off time of gate generator 16 the drum 10 is being erased by means of erase head 17 and circuitry 21, and, since amplifier 12 is turned off, the information read from the drum is not re-recorded thereon, thereby providing a clean portion on the drum preventing saturated thereof. This gating is employed such that only during the signified period when reply pulses are to be received will any pulses be written onto drum 10, thus minimizing the amount of information which the drum will have stored thereon, and hence, preventing saturation thereof. The gating is shown in FIGURE 2E. The erasing circuitry 21 is not described in detail herein since such circuitry is well known in the art. A detailed description thereof is not deemed necessary for a proper understanding of this invention.

In an exemplary embodiment the triggering wheel or drum 18 is rotated at N r.p.m. and the magnetic drum 10 is rotated at $k(N+n)$ r.p.m., the difference in speed between the triggering wheel 18 and drum 10 is such that subsequent reply pulses will be recorded on the surface of the drum at a position slightly different from that of the previous reply pulse. This is illustrated in FIGURE 2B where it is shown that the first pulse, second pulse, third pulse etc. are recorded on the magnetic drum at slightly different portions thereof.

The active part of drum 10 is reduced to the length required by the heads and eraser, so the actual rate of rotation (from the view point of signals recorded) is increased; this has been taken care of in writing the expression for the speed of the drum with the $k$ coefficient.

For illustration purposes we can consider that the triggering wheel 18 rotates at N r.p.m. while the drum signals are rotating at $N+n$ r.p.m. When an interrogation is transmitted by the airborne equipment, the reply from the beacon occurs with a delay of $t$ (function of the distance); it is recorded on the drum at the time of its arrival.

At the next turn of both wheel and drum, the time difference between the triggering pulse and the reply recorded on the drum will be $t+T$. This is due to the difference between speeds of rotation. If one interrogation is transmitted for each trigger pulse the successive replies will be recorded on the drum at specific intervals.

This constant time interval between successive pulses, as recorded on the drum, is a characteristic of the replies to the interrogation of this particular airborne equipment.

The movement of the aircraft between successive pulses is negligible and may be neglected for the purposes of this description. When a pulse train has this characteristic a suitable ringing circuit 14 and threshold detector 15 provides a distance pulse to the distance circuits. To avoid saturation of the drum by the randomly spaced pulses a blanking gate having a predetermined duration less than $t_1$ (see FIGURE 2E) is applied to the gated amplifier 12 for each distance pulse from the detector 15. The length of it is chosen to keep the number of useful pulses sufficient to operate the ringing circuit 14 during the next cycle.

It should be clear that the ringing circuit described herein could be replaced by an integration circuit having the required timing requirements or any other similar device by one ordinarily skilled in the art within the spirit of this invention.

Distance information can be obtained with a minimum of pulses sent out using drums available at the present time.

While a magnetic drum is illustrated as the medium upon which the received pulses are recorded, it would be obvious that other means such as a magnetic tape could be employed. Thus, it is to be understood that the embodiment shown is illustrative only, and that many variations and modifications may be made without departing from the principles of the invention herein disclosed and defined by the appended claims.

I claim:

1. Apparatus for detecting pulses having a predetermined repetition rate which are interleaved in a random pulse train comprising:
   a source of pulses having said predetermined repetition rate;
   record means having a predetermined length;
   means coupled to said source of pulses for recording said pulses on record means;
   means for causing relative movement between said record means and said means for recording such that said means for recording traverses the length of said record means in a first time period slightly different from the repetition period of said pulses to be detected;
   means for reading said record means; and
   generating means coupled to said reading means and to said source of pulses for generating an output signal responsive to a predetermined number of pulses having a spacing substantially equal to the difference between said first time period and the repetition period of said pulses to be detected.

2. Apparatus as in claim 1 in which said record means includes a magnetic drum, said means for recording includes a first magnetic head, and said means for reading includes a second magnetic head.

3. Apparatus as in claim 2 in which said means for causing relative movement between said record means and said means for recording includes means for maintaining said first magnetic head stationary and means for rotating said magnetic drum.

4. Apparatus as in claim 3 in which said magnetic drum is rotated at a rate greater than the repetiton period of said pulses to be detected.

5. Apparatus as in claim 3 further including triggering means coupled to said means for rotating said drum for generating a train of pulses having substantially the same repetition rate as those pulses provided by said source of pulses.

6. Apparatus as in claim 5 wherein said triggering means includes a triggering wheel coupled to said magnetic drum, said triggering wheel rotating at a rate corresponding to the repetition rate of said train of pulses.

7. Apparaus as in claim 1 further comprising:
   means for erasing said record means after said information is read by said reading means; and means coupled to said reading means for re-recording on said record means at least a portion of the information read by said reading means.

8. Apparatus as in claim 7 wherein said re-recording means includes means coupled to said generating means for inhibiting said re-recording for a predetermined period of time after said output signal is generated, thereby preventing said record means from becoming saturated.

9. Apparatus as in claim 8 wherein said re-recording means includes:
   gating means responsive to said output signal having a predetermined duration less than the repetition period of said pulses to be detected; and
   a gated amplifier coupled to said gating means for blocking the output thereof responsive to said gate signal.

10. Apparatus as in claim 1 wherein said generating means include:
    first means coupled to said reading means for generating a signal which increases in amplitude responsive to pulses having a spacing substantially equal to the difference between said first time period and the repetition period of said pulses to be detected; and
    a threshold detector coupled to said first means for providing an output signal when the output from said first means exceeds a predetermined threshold value.

11. Apparatus as in claim 10 in which said first means includes a ringing circuit.

12. Apparatus as in claim 11 wherein the period of the output signal from said ringing circuit is substantially equal to the magnitude of the difference between said first time period and the repetition period of said pulses to be detected.

References Cited
UNITED STATES PATENTS

| | | | |
|---|---|---|---|
| 2,487,995 | 11/1949 | Tucker | 343—17.1 X |
| 2,524,837 | 10/1950 | Russell et al. | 343—17.1 |
| 3,081,456 | 3/1963 | DiToro | 343—118 |

RODNEY D. BENNETT, *Primary Examiner.*

D. C. KAUFMAN, *Assistant Examiner.*